(12) United States Patent
Peli

(10) Patent No.: US 7,374,284 B2
(45) Date of Patent: May 20, 2008

(54) PERIPHERAL FIELD EXPANSION DEVICE

(75) Inventor: Eliezer Peli, Newton, MA (US)

(73) Assignee: The Schepens Eye Research Institute, Inc., Boston, MA (US)

( * ) Notice: Subject to any disclaimer, the term of this patent is extended or adjusted under 35 U.S.C. 154(b) by 0 days.

(21) Appl. No.: 10/583,682

(22) PCT Filed: Dec. 16, 2004

(86) PCT No.: PCT/US2004/042390

§ 371 (c)(1),
(2), (4) Date: Jun. 19, 2006

(87) PCT Pub. No.: WO2005/059630

PCT Pub. Date: Jun. 30, 2005

(65) Prior Publication Data

US 2007/0097316 A1 May 3, 2007

Related U.S. Application Data

(60) Provisional application No. 60/530,203, filed on Dec. 17, 2003.

(51) Int. Cl.
*G02C 7/02* (2006.01)
*G02C 7/14* (2006.01)

(52) U.S. Cl. .................................. 351/175; 351/170

(58) Field of Classification Search ............ 351/160 R, 351/168, 164, 170, 175
See application file for complete search history.

(56) References Cited

U.S. PATENT DOCUMENTS 2,058,676 A   10/1936   Foster .......................... 88/33

(Continued)

OTHER PUBLICATIONS

Peli, E., "Field Expansion for Homonymous Hemianopia by Optically Induced Peripheral Exotropia", Optometry and Vision Science, vol. 77, No. 9, Sep. 2000.

(Continued)

*Primary Examiner*—Scott J. Sugarman
*Assistant Examiner*—Darryl J Collins
(74) *Attorney, Agent, or Firm*—Weingarten, Schurgin, Gagnebin & Lebovici LLP

(57) ABSTRACT

A spectacle system is disclosed for shifting the field expansion property of peripheral prisms from the upper and lower peripheral visual fields toward the central visual field of a person with peripheral field loss, and particularly hemianopia, while maintaining the lateral field expansion. In terms of perceived image, the spectacle system includes image-shifting devices that shift the perceived images from the central missing visual fields toward the upper and lower peripheral visual fields. The image-shifting devices are placed out of the central visual field and do not interfere with the normal central or foveal vision of the wearer. The spectacle system can be fitted onto one or both carrier lenses of a pair of spectacles and includes at least one image-shifting device. The image-shifting device includes a plurality of image-shifting elements. In one embodiment, the image-shifting device includes a plurality of image-shifting mirror elements that are arranged to form a Fresnel-like mirrors based prism. In another embodiment, the image-shifting elements can include either a plurality of image shifting mirrors or a plurality of image-shifting prisms that are oriented such that the optical axis of each image-shifting element forms an acute angle with the horizontal visual meridian of the person wearing the spectacles.

16 Claims, 8 Drawing Sheets

U.S. PATENT DOCUMENTS

| | | | |
|---|---|---|---|
| 2,710,560 A | 6/1955 | Thompson | 88/33 |
| 4,572,625 A | 2/1986 | Arndt | 350/541 |
| 4,575,204 A * | 3/1986 | Heide et al. | 351/155 |
| 4,653,879 A | 3/1987 | Filipovich | 350/538 |
| 4,655,562 A | 4/1987 | Kreitzer et al. | 350/538 |
| 4,704,000 A | 11/1987 | Pekar et al. | 350/145 |
| 4,795,235 A | 1/1989 | Spitzberg | 350/145 |
| 5,138,487 A | 8/1992 | Ahn | 359/431 |
| 5,969,790 A | 10/1999 | Onufryk | 351/175 |
| 6,139,145 A * | 10/2000 | Israel | 351/160 R |
| 6,775,060 B2 | 8/2004 | Peli et al. | 359/409 |

OTHER PUBLICATIONS

Attitudes, Best New Ideas, Product Advertisement for World's Smallest 8-Power Telescope, Spring 1993.

* cited by examiner

PERIPHERAL FIELD EXPANSION DEVICE

CROSS REFERENCE TO RELATED APPLICATIONS

This application claims priority from U.S. Provisional Application No. 60/530,203, filed Dec. 17, 2003, entitled PERIPHERAL FIELD EXPANSION, the whole of which is hereby incorporated by reference herein.

STATEMENT REGARDING FEDERALLY SPONSORED RESEARCH OR DEVELOPMENT

Part of the work leading to this invention was carried out with United States Government support provided under a grant from the National Institutes of Health/National Eye Institute, Grant No. EY12890. Therefore, the U.S. Government has certain rights in this invention.

BACKGROUND OF THE INVENTION

Stroke, head injury and tumors commonly cause loss of peripheral vision in a condition called Hemianopia. The number of disabled stroke survivors in the United States is estimated to be more than 3 million annually. As many as one third of stroke survivors in rehabilitation have either Homonymous Hemianopia or Hemineglect.

Homonymous Hemianopia, which is considered to be a visual field defect, is the loss of half the visual field on one side in both eyes. This condition causes difficulties with general mobility (obstacle detection and navigation), as people with Homonymous Hemianopia are likely to walk into obstacles on the side of the field loss, such as furniture or objects on the floor. Many people afflicted with this condition avoid busy places for fear they will bump into other people or objects. People with Homonymous Hemianopia are prohibited from driving in 22 states (Peli E, Peli D, 2002). In many other states, they are discouraged from driving even when the laws do not prohibit driving (Tant M L et al., 2001). Accordingly, people with Homonymous Hemianopia may lose much of their independence.

Various devices such as mirrors, partially reflecting mirrors (beam splitters), prisms, and reversed telescopes have been considered and used for management of Hemianopic field defects (Fanning G J, 1972; Rossi P W et al., 1990). The purpose of such devices is to improve patients' awareness of obstacles on their blind side to improve their mobility. These devices may be classified as providing either field relocation (shifting) or field expansion. Field expansion is preferred, since the simultaneous field seen by the person is larger with the device than without. Field relocation only exchanges the position of the lost field relative to the environment. A number of devices provide field expansion, but none has proven entirely successful (Peli E, 2000).

For example, reversed telescopes increase the visual field but reduce visual acuity. These devices are cumbersome, heavy and unsightly when mounted in spectacles and rarely used for Hemianopia. Mirrors expand the field in one direction, but at the same time block vision in another. Mirrors also reverse the images, making interpretation of the visual field difficult. In addition, mirrors are cosmetically poor, and safe mounting of mirrors close to the eye is difficult. Beam splitters expand the field through diplopia (double vision), which can be very confusing, and as an additional problem, the reflected images are reversed. Beam splitters also have the same cosmetic and safety issues associated with mirrors.

Prism devices find numerous applications for Hemianopia, but only a few of these actually expand the field. The monocular prisms that have been used in the past, including a sector prism base out in front of one eye with the edge of prism placed at the pupil, or the round button used in the Gottlieb system, result in double vision. Devices employing monocular sector prisms truly expand the visual field when the patient moves his/her direction of gaze to within the field of the prism. As long as the patient's eyes are at a primary position of gaze or are directed away from the Hemianopic field, the monocular sector prism has no effect on the field of view (i.e. no field expansion). When gaze is directed into the field of the prism, field expansion results. However, it is accompanied by (central) diplopia and the confusing appearance of two different objects in the same perceived direction. Confusion in this case represents the intended beneficial effect, as it represents the appearance of an object that would be invisible without the prism. However, the central diplopia induced with the prism is unpleasant to the patient and may account for the lack of success in sustained use of monocular sector prisms by people with Homonymous Hemianopia (Gottlieb D D et al., 1996).

There are two schools of thought as to why patients generally discontinued use of these prisms after 2-3 months. Some practitioners point out that patients discontinue using them because their scanning ability increases. Some even claim that wearing these prisms results in a restoration of some of the lost visual field (Gottlieb D D et al., 1998.) However, no scientific proof of such scanning increase or restoration change has been provided. Other practitioners state that patient frustration and the difficulty of use are why the patients discard them. Thus, although a variety of image-shifting devices such as prisms and mirrors have been proposed as aids for hemianopic individuals, none has proven very effective.

One prior art method that was able to expand the visual field rather than relocate it, function in all positions of gaze, and avoid central diplopia included a monocular sector prism that is disposed in the peripheral visual field of the user (Peli E, 2000). The monocular sector prism can be placed in the superior or inferior peripheral field, or it may be placed simultaneously in both. The monocular sector prism is placed across the whole width of the lens and is effective at all lateral positions of gaze. For example, in this configuration, a prism of 40Δ shifts the image by about 20 degrees. The prism expands the field via peripheral diplopia. Peripheral diplopia is much more comfortable for the user than central diplopia since peripheral physiologic diplopia is a common feature of normal vision. The field expansion effect is unaltered by lateral eye and head movements over a wide range of movements into either side.

The purpose of a system of one or more peripheral prisms is to provide obstacle awareness within the blind field in areas that are important for general mobility. Studies of persons with Homonymous Hemianopia have concluded that the most important areas for obstacle awareness that are important for general mobility are the central visual area that includes both outer and inner central areas. The outer and inner central areas are defined as a ring with a 21-37 degree radius and a circle with a 21 degree radius respectively. Studies of mobility performance of patients with restricted peripheral fields resulting from retinitis pigmentosa also suggest that extension of peripheral field loss into the central area in a 20 degree radius and a 10 degree radius significantly impacts on mobility performance.

The visual field expansion that is produced with the current arrangement of peripheral prisms in the prior art only extends a limited amount into the outer central area of the blind hemi-field. For example, the lower prism in this system is currently fitted with the upper edge at a height that will project it to 4 meters away on the ground when viewing a fixation point at eye level. For a person having a height of 5'6" this translates to an angle of about 23 degrees below the fixation point. Thus the effect of the lower prism, i.e. the field expansion, will only start below this point and does not reach into the inner central area. A slightly higher fitting position is possible but in any case the central area remains unaffected by the prisms Thus, it would be desirable to provide a simple and inexpensive way of moving the area of field expansion of the blind hemi-field into areas that are important for general mobility, i.e., towards the inner central visual area, without having to alter the fitting positions of the upper and lower prism segments.

BRIEF SUMMARY OF THE INVENTION

A spectacle system is disclosed for shifting the field expansion property of the peripheral prisms from the upper and lower peripheral visual fields toward the central visual field of a person with peripheral field loss and particularly hemianopia, while maintaining the lateral field expansion. In particular, in terms of the perceived image, the spectacle system includes image-shifting devices that shift the perceived images from the central missing visual fields toward the upper and lower peripheral visual fields. However, the image-shifting devices are not located in the central visual field where they may interfere with the person's normal central or foveal vision. The spectacle system can be fit onto, or formed within, one or both carrier lenses of a pair of spectacles and includes at least one image-shifting device. The image-shifting device is composed of a plurality of image-shifting elements. In one embodiment, the image-shifting device includes either a plurality of image-shifting prisms forming a Fresnel prism or a plurality of image-shifting mirror elements arranged to form a Fresnel-like mirrors based prism. The image-shifting elements are oriented such that the optical axis (base to apex axis in the case of a prism) of each image-shifting element forms an acute angle with the horizontal visual meridian of the person wearing the spectacles. In an alternative embodiment of a Fresnel-like mirrors based prism, the image-shifting mirror elements may be oriented such that the optical axis of each image-shifting element is parallel to the horizontal visual meridian of the person wearing the spectacles. The latter embodiment is similar in effect to the basic peripheral prisms described in the prior art but provides a more powerful prismatic effect than that possible with simple prisms.

Preferably, the spectacle system of the invention provides visual field shifting for a person wearing a spectacle frame having a carrier lens that has a central viewing area and a peripheral viewing area above and below said central viewing area. An image-shifting device, disposed in a peripheral viewing area of the carrier lens, includes a plurality of image-shifting elements, each of which is oriented such that an optical axis of the plurality of image-shifting elements forms an angle between 10° and 60° relative to a horizontal visual meridian defined by the eyes of the person wearing the spectacle frame. The image-shifting device can be disposed in the peripheral viewing area above the central viewing area such that the upper image-shifting device provides a lateral and upward shift of the image perceived through the field of the device. Alternatively, the image-shifting device can be a lower image-shifting device that is disposed in the peripheral viewing area below the central viewing area and provides a lateral and downward shift of the perceived image. In another embodiment, the image-shifting device can include both upper and lower image-shifting devices disposed in the peripheral viewing areas above and below the central viewing area, respectively. The upper image-shifting device provides a lateral and upward shift of the perceived image, and the lower image-shifting device provides a lateral and downward image shift such that the wearer is able to view through the devices an image that otherwise would fall in the blind side centrally.

In another embodiment, a spectacle system is provided for providing visual field shifting for a person wearing a spectacle frame having first and second carrier lenses, each of which has a central viewing area, and a peripheral viewing area above and below the central viewing area is provided. In particular, this spectacle system includes first and second image-shifting devices disposed in the peripheral viewing area of the first and second carrier lenses, respectively. The first image-shifting device includes first upper and first lower image-shifting devices disposed in the peripheral viewing areas above and below the central viewing area of the first carrier lens, respectively, wherein the first upper image-shifting device provides a lateral and upward shift of the perceived image and the first lower image-shifting device provides a lateral and downward image shift. The second image-shifting device includes second upper and second lower image-shifting devices disposed in the peripheral viewing areas above and below the central viewing area of the second carrier lens, respectively, wherein said second upper image-shifting device provides a lateral and upward shift of the perceived image and the second lower image-shifting device provides a lateral and downward image shift. The first and second image-shifting devices including first and second pluralities of image-shifting elements, respectively, and each of the first and second plurality of image-shifting elements is oriented such that an optical axis of each of the plurality of image-shifting elements forms an angle between 10° and 60° relative to a horizontal meridian defined by the eyes of the person wearing the spectacle frame.

In the embodiments described herein, the plurality of image-shifting elements that make up the image-shifting devices can be monocular sector prisms, e.g., Fresnel prisms, that are arranged in a side-by-side juxtaposed arrangement to form an image-shifting device. Alternatively, the plurality of image-shifting elements that make up the image-shifting devices can be image-shifting mirrors pairs that are arranged in a side by side juxtaposed arrangement to form a Fresnel-like image-shifting device. Construction of such image-shifting mirrors pairs would most likely be carried out in a transparent medium other then air. As a result, such a mirror device will also have some prismatic effect due to the variable thickness of the transparent medium filling the space between the mirrors. However, most of the image shifting power will be derived from the angle between the two mirrors in each pair.

BRIEF DESCRIPTION OF THE DRAWINGS

The present invention will be more fully understood by reference to the following Detailed Description of the Invention and to the claims, taken in conjunction with the accompanying Drawings, in which:

DETAILED DESCRIPTION OF THE INVENTION

Figure 1:
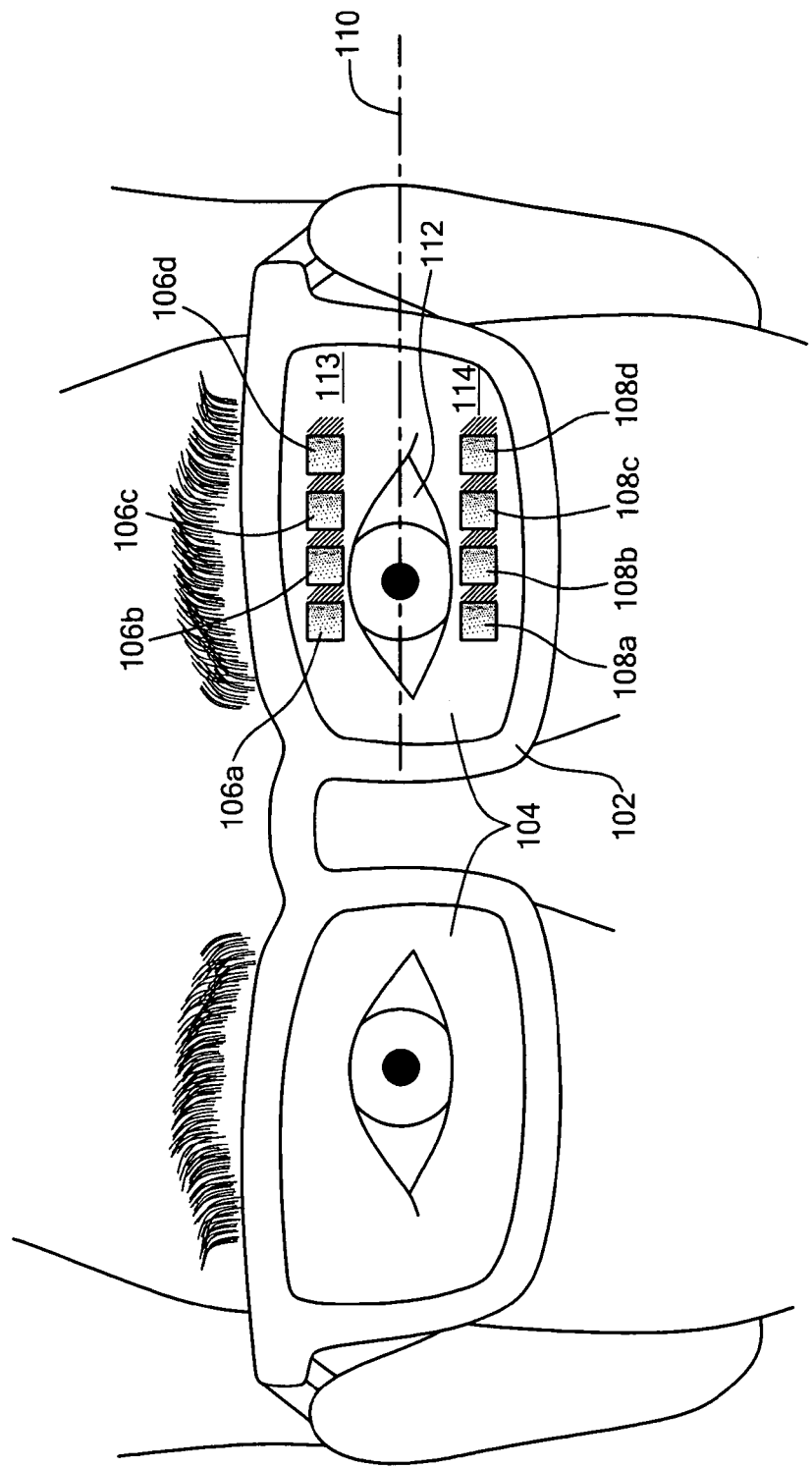
FIG. 1 is a perspective front schematic view of one embodiment of the present invention.

FIG. 1 depicts a front perspective view of one embodiment of the spectacle system of the present invention, the embodiment in which a plurality of image-shifting elements are configured and arranged to form a Fresnel-like mirror. In this embodiment, the image-shifting mirror elements are oriented such that the optical axis of each image-shifting element is parallel to the horizontal visual meridian of the person wearing the spectacles.

Referring to FIG. 1, a person in need of visual correction wears a spectacle frame 102 that includes carrier lenses 104. The viewing field through a carrier lens 104 is divided into a central viewing area 112, an upper peripheral viewing area 113 and a lower peripheral viewing area 114, where a horizontal meridian 110 aligned with the eyes of the wearer bisects the central viewing area and wherein the upper peripheral area is above the horizontal meridian and the lower peripheral area is below the horizontal meridian. The spectacle system of the invention can include a Fresnel-like image-shifting mirror in the upper peripheral viewing area 113, the lower peripheral viewing area 114, or both. As shown, image-shifting mirror elements are disposed in only one of the carrier lenses 104. Alternatively, one or two image-shifting devices with Fresnel-like image-shifting mirror elements can be disposed in both of the carrier lenses. An image-shifting mirror as shown in FIG. 1 includes a plurality of image-shifting mirror elements 106a-106d in the upper peripheral viewing area 113 and a plurality of image mirror elements 108a-108d in the lower peripheral viewing area 114, each forming Fresnel-like mirror assemblies.

Figure 2:
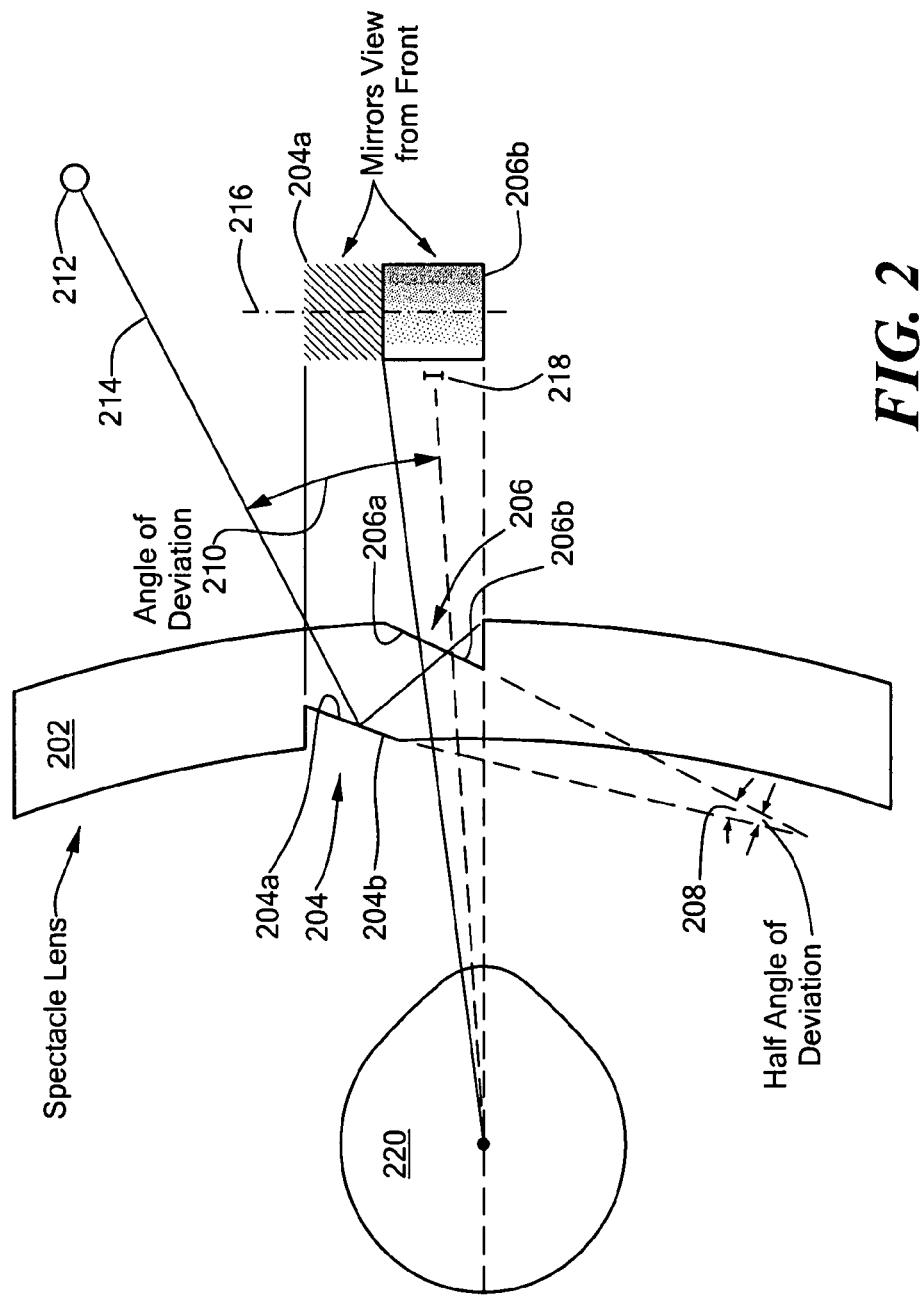
FIG. 2 is a top view of a cross-section of the embodiment depicted in FIG. 1. For simplicity, only one of the mirror pairs is shown.

In the embodiment depicted in FIG. 1, the image-shifting mirror elements are mirror elements such as those depicted in FIG. 2. As shown in FIG. 2, an image-shifting mirrors pair is disposed within the carrier lens 202. The image-shifting mirrors pair includes a first mirror 204, which includes reflecting surface 204a and backing 204b, and a second mirror 206, which includes reflecting surface 206a and backing 206b. The reflecting surfaces 204a and 206a face toward one another so that light 214 from object 212 is reflected from mirror 204 to mirror 206 and then to eye 220 of the wearer. The reflecting surfaces 204a and 206a of the mirrors 204 and 206 are oriented such that the two reflecting surfaces subtend a predetermined angle 208. Angle 208 is referred to as the "half angle of deviation" and is one-half a predetermined angle 210, referred to as the "angle of deviation." An object 212 having light 214 reflected therefrom, which is in an un-viewable peripheral field area, is shifted to a position within the viewable area via the image-shifting mirror segments 204 and 206 and viewed as image 218 in reflecting mirror surface 206a. As depicted in FIG. 1, when viewed from the front, mirrors 204 and 206 show the reflecting side 204a and the backing side 206b respectively.

Referring again to FIG. 1, each of the image-shifting mirrors 106a-106d and 108a-108d is oriented such that the mirror 204, i.e., the mirror having reflecting surface 204a visible from the front, is on the side corresponding to the visual field loss of the wearer. Thus, the reflecting surface 204a of each image-shifting mirror is placed adjacent to and juxtaposed with the backing surface 206b of the adjacent mirror. In this manner, a Fresnel-like mirrors-based prism is formed.

Figure 3:
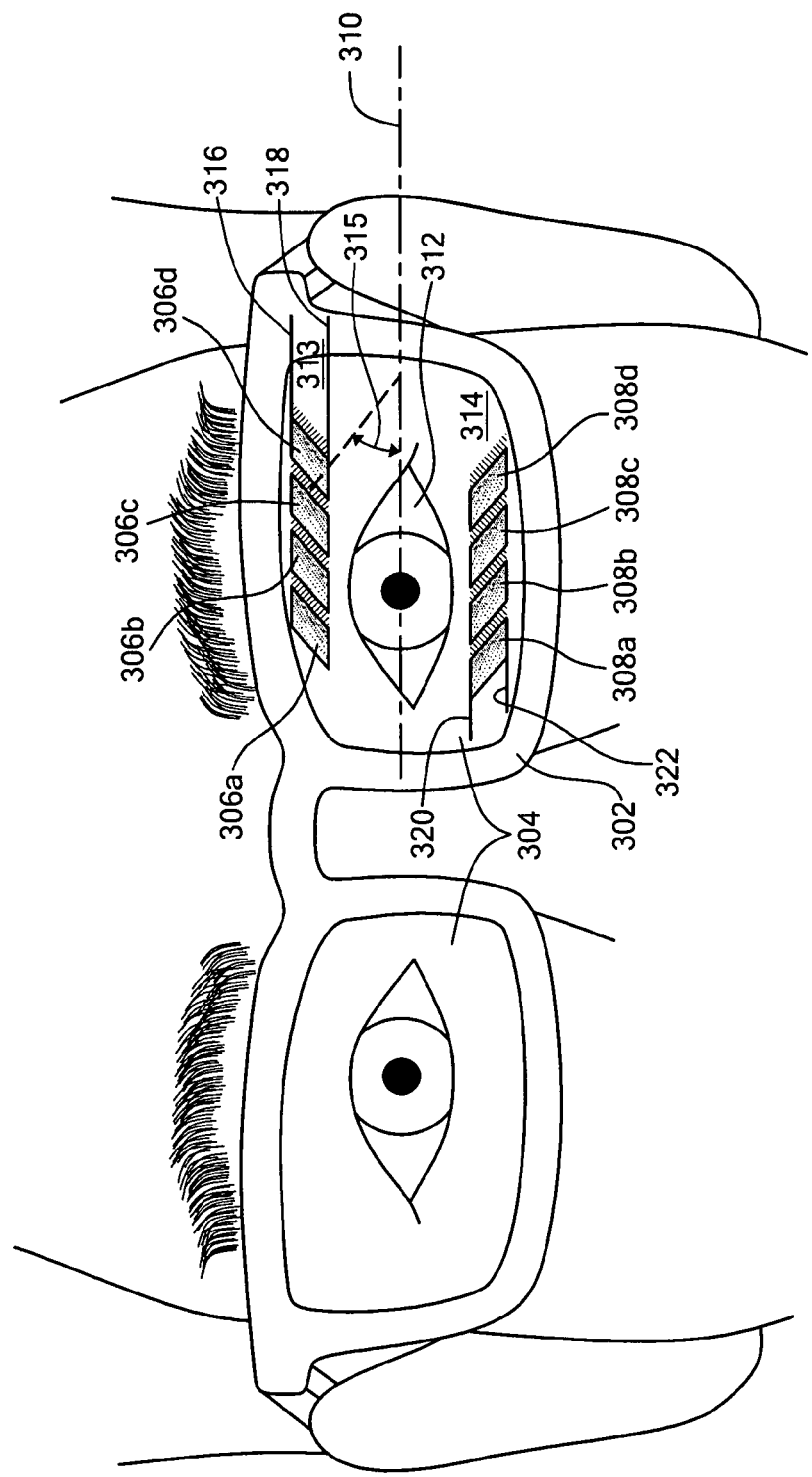
FIG. 3 is a perspective view of another embodiment of the present invention.

FIG. 3 depicts a preferred embodiment of the spectacle system of the present invention in which a plurality of image-shifting elements are configured and arranged to form a Fresnel-like image-shifting device, but one in which all image-shifting elements are rotated by a predetermined amount. In particular, FIG. 3 depicts a person wearing a spectacle frame 302 that includes carrier lenses 304. The viewing field through a carrier lens 304 is divided into a central viewing area 312, an upper peripheral viewing area 313 and a lower peripheral viewing area 314, where a horizontal visual meridian 310 aligned with the eyes of the wearer bisects the central viewing area 312 and wherein the upper peripheral area 313 is above the horizontal meridian and the lower peripheral area 314 is below the horizontal meridian. The spectacle system of the present invention can include a Fresnel-like image-shifting device in the upper peripheral viewing area 313, the lower peripheral viewing area 314, or both. Alternatively, one or two Fresnel-like image-shifting devices may be placed in both of the carrier lenses. A Fresnel-like image-shifting device includes a plurality of image-shifting elements 306a-306d in the upper peripheral viewing area 313 and a plurality of image elements 308a-308d in the lower peripheral viewing area 314. As depicted in FIG. 3, however, each individual image-shifting element is oriented with respect to the horizontal meridian 310 to form an acute angle 315 with the horizontal meridian 310.

The image-shifting elements can be image-shifting mirrors as depicted in FIG. 2. Referring to FIG. 2, when viewed from the front, an optical axis 216 is orthogonal to the intersection between the reflecting surface 204a and the backing 206b. The optical axis 216 and the horizontal meridian 110 (as depicted in FIG. 1) are substantially parallel to one another. In contrast, in the embodiment depicted in FIG. 3, the optical axis 216 and the horizontal meridian 310 subtend an acute angle 315.

Figure 6:
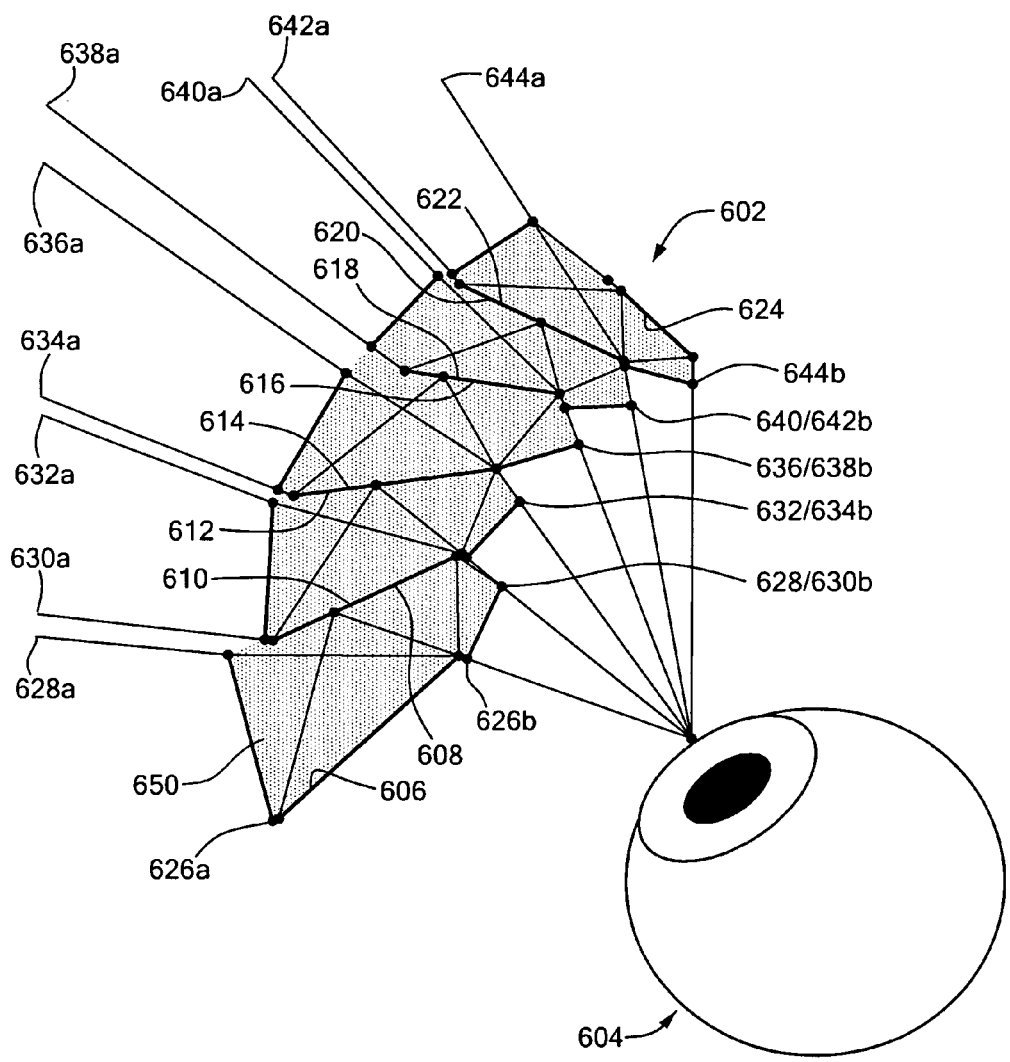
FIG. 6 is a top view in cross-section of a computed design of the embodiment depicted in FIG. 1, showing the orientation of mirrors pairs of an image-shifting device and an optical plastic filling the spaces between the mirrors.

FIG. 6, which is a top view in cross-section of a computed design of the embodiment depicted in FIG. 1, shows the details and constraints involved in constructing such a mirrors based Fresnel-like prism device. The device shown can be either the upper or lower segment of a horizontal design image-shifting device. In FIG. 6 specifically, device 602 is configured for use in conjunction with a carrier lens for the left eye 604, viewed from the top. In the design shown, five pairs of mirrors (606/608, 610/612, 614/616, 618/620 and 622/624) are oriented so as to shift image portions located in the direction of 626a, 628a, 630a, 632a, 634a, 636a, 638a, 640a, 642a and 644a to the perceived image portions located in the direction of 626b, 628/630b, 632/634b, 636/638b, 640/642b and 644b, respectfully. Once such a mirrors based prism is made, it can be cut on a diagonal and placed in the carrier lens in the same way that a regular Fresnel prism shown in FIG. 7 was cut and placed in the carrier lens. An optical plastic fills the spaces 650 between the mirrors, thus creating an element that can be constructed, cut either orthogonal to the view shown or diagonally for the oblique design, and then placed in the carrier lens.

Figure 4:
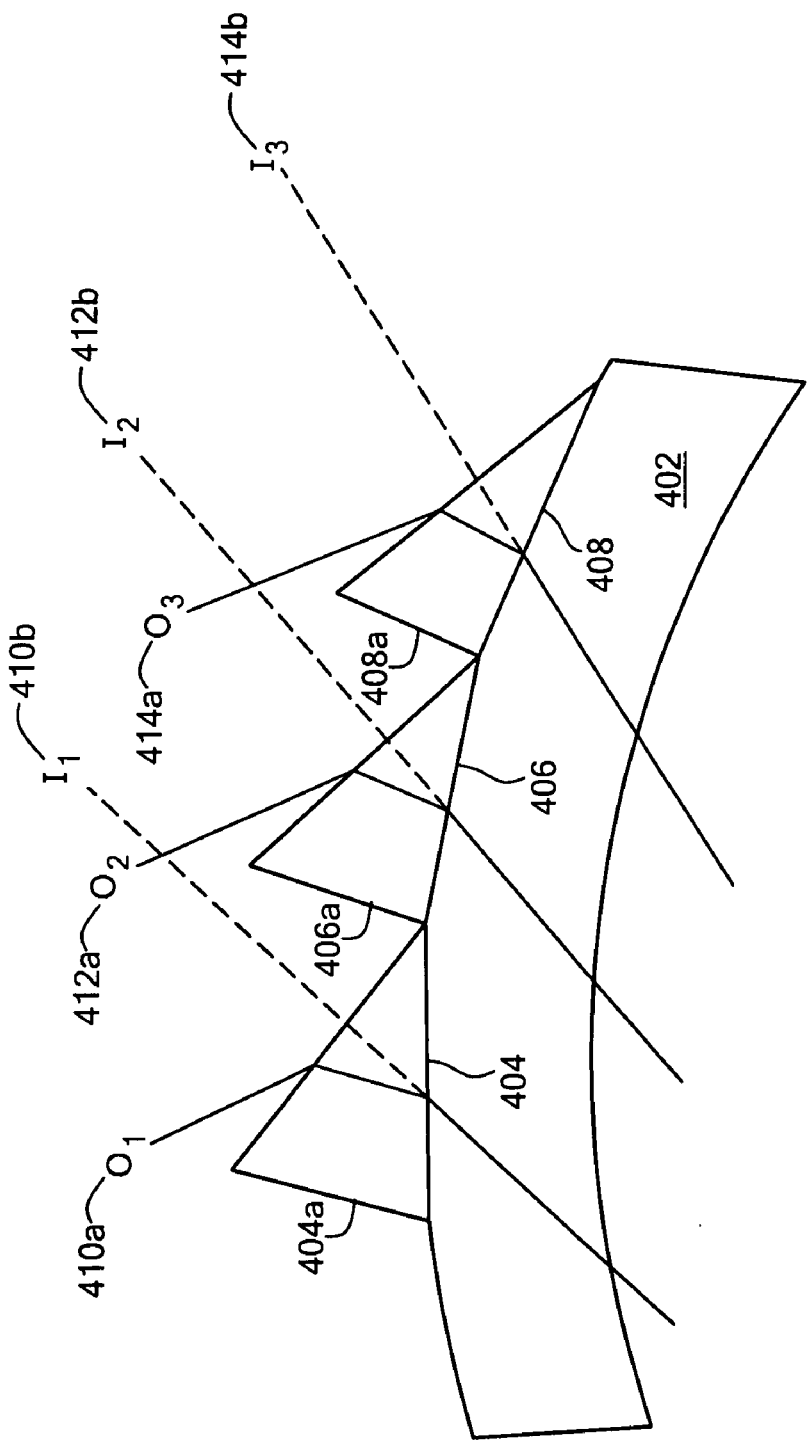
FIG. 4 is a top view of a cross-section of an alternative to the embodiment depicted in FIG. 3.

In another configuration of the embodiment of FIG. 3, the image-shifting elements can be monocular sector prisms, e.g. Fresnel prisms. As depicted in FIG. 4, a carrier lens 402 has a plurality of prisms 404, 406, and 408 attached to the outer surface of the carrier lens 402. The prisms 404-408 are oriented such that the base of each prism 404a, 406a, and 408a, respectively, is generally oriented toward the side of the carrier lens corresponding to the visual field loss of the wearer and the apex of the prism is generally oriented toward the remaining visual field. For each prism, an optical axis is defined as being orthogonal to its base and extending to its apex. As depicted in FIG. 4, objects 410a, 412a, and 414a that are in the lost visual field are shifted by the prismatic action of the prisms to be perceived as images 410b, 412b, and 414b in the wearer's remaining visual field.

Figure 7:
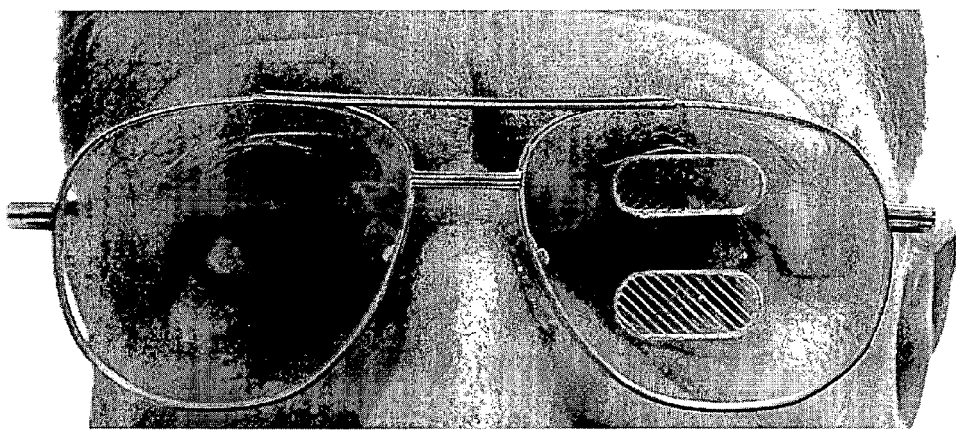
FIG. 7 is a photograph of a person wearing an embodiment of the present invention. In this case, the image-shifting device is a regular Fresnel prism.

Referring again to FIG. 3, in the embodiment in which monocular sector prisms are used as the individual image-shifting elements, the individual monocular section prisms are rotated such that the optical axis of each prism forms an acute angle with the horizontal meridian 310. In a preferred embodiment, the prisms can be formed such that the rotated prism elements form even upper and lower edges 316 and 318 for the image-shifting elements in the upper peripheral viewing area and form even upper and lower edges 320 and 322 for the for the image-shifting elements in the lower peripheral viewing area. The rotated elements form, in essence, a Fresnel prism in which all of the elements are rotated together. A photograph of such a system incorporating prisms set at 45 degrees as might be worn by a patient with left hemianopia is shown in FIG. 7.

Rotating the image-shifting element to form an acute angle with the horizontal meridian 310 as described above, provides a vertical, as well as a horizontal prismatic effect that moves the area of field expansion toward the center viewing region 312. In particular, image-shifting devices disposed in the upper peripheral viewing area 313 operate to shift the perceived images laterally and upward. Image-shifting devices disposed in the lower peripheral viewing area 314 operate to shift the perceived images laterally and downward. In each of these cases, the clear segment of the carrier lens 304, i.e., the central viewing area 312 is maintained for central vision and is not affected by the presence of any image-shifting devices therewithin. It is thought that shifting the field expansion area vertically inwards towards the center of the visual field by at least 10 degrees for each upper and lower prism element will be beneficial for enhancing the general mobility of hemianopic patients.

For example, for an image-shifting device using a 40Δ prism in the lower peripheral viewing area 313, in which the prism portions' upper edges 320 are the same height and the optical axis of each image-shifting prism forms a 30 degree angle with the horizontal meridian 310, the added vertical component resulting from the angled prism would move the shifted images to about 12 degrees below the fixation point, well within the inner central area of the blind hemi-field. For a 5'6" person in the above example, this means that the upper edge of the lower prism would project to a point 8 meters away when viewing an object at eye level. Advantageously, obstacles would be detected earlier, thus improving confidence in obstacle avoidance and general mobility.

Figure 5A:
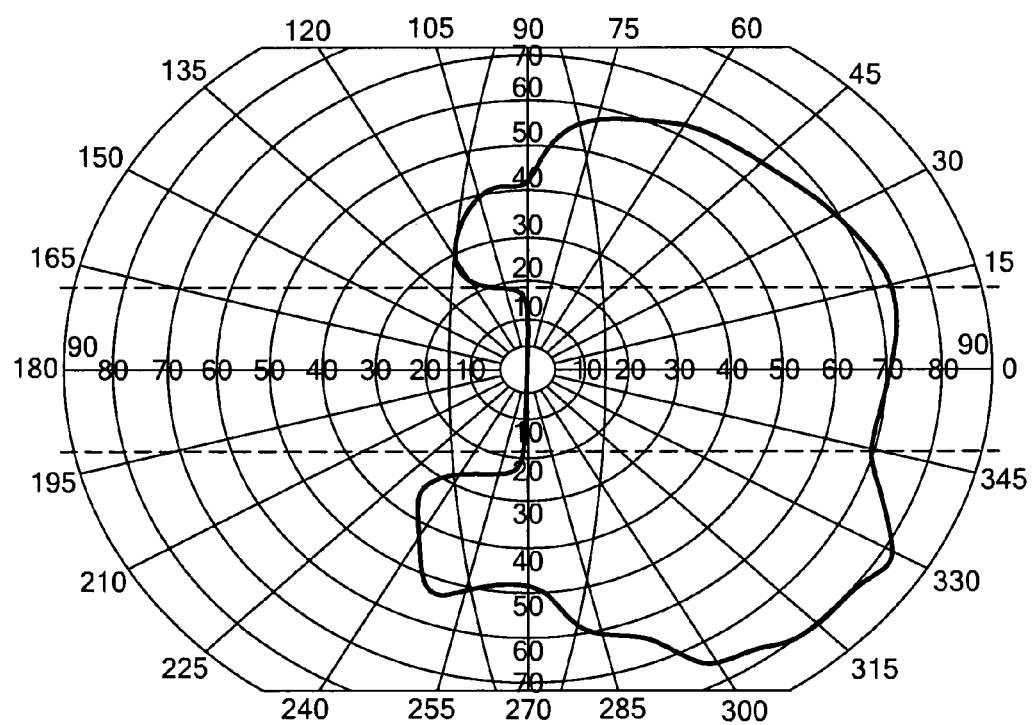
FIG. 5a depicts the binocular visual fields of a patient with Hemianopia using the prior art Fresnel prisms.
Figure 5B:
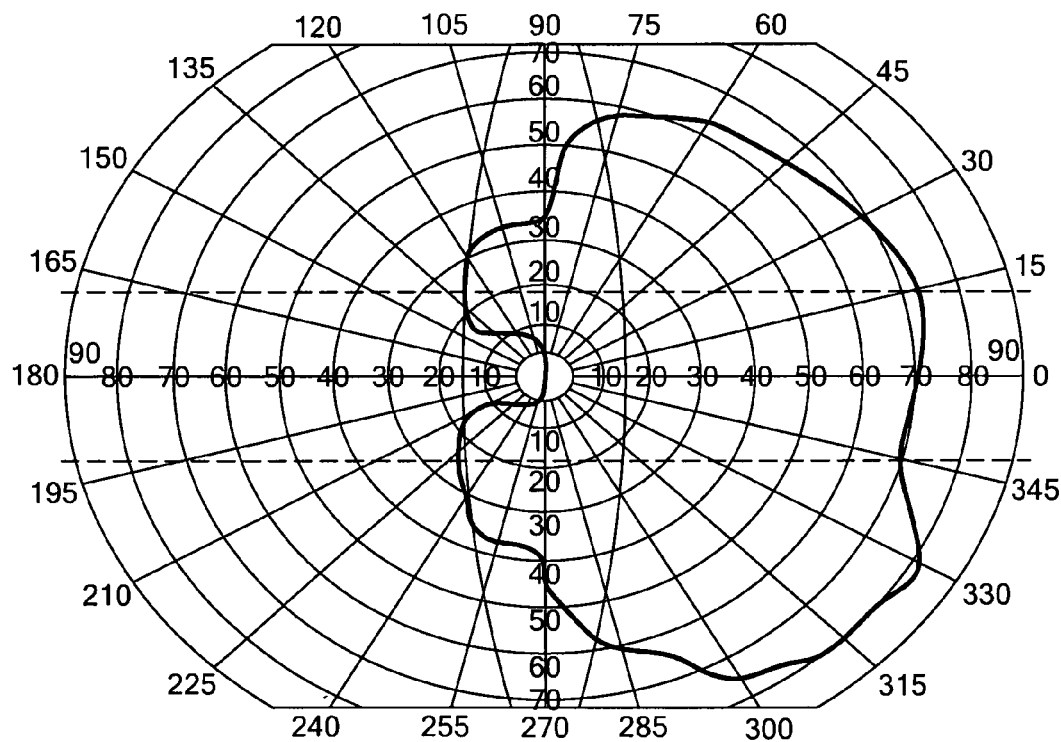
FIG. 5b depicts the binocular visual fields of a patient with Hemianopia using the present invention.

FIGS. 5a and 5b present the visual field plots for one hemianopic patient wearing peripheral prisms in the prior art configuration (FIG. 5a) and wearing peripheral prisms in a preferred embodiment of the invention (FIG. 5b) in which the optical axis of the image-shifting prism elements form an angle of 30 degree to the horizontal meridian. As depicted in FIG. 5b, the shift of the field expansion towards the central area of the blind hemi-field is clearly evident with the arrangement of the image-shifting prisms in the preferred embodiment of the current invention.

As described above, it is beneficial to have the area of field monitored by the upper and lower prisms brought closer to the center of the field by at least 10 degrees. For a 40Δ prism, the 30 degree prism setting is the minimum angle that achieves this required vertical displacement. However, as the angle of the optical axis of the prism to the horizontal meridian is increased from 0 to 90 degrees, there is a gradual decrease in the horizontal extent of the field expansion, which more rapidly decreases beyond an angle of 45 degrees, although useable results can be achieved as high as 60 degrees. For an angle of 30 degree formed between the optical axis of the prism and the horizontal meridian, the decrease in horizontal expansion is only 3 degrees, out of 20, compared to the configuration in which the optical axis of the prism is parallel to the horizontal meridian. Therefore, the 30 degree angle provides a good compromise with a significant movement of the vertical field expansion towards the central field for only a minor reduction in horizontal field expansion.

It is desirable to move the field expansion as far towards the central area of the blind-hemi field of the spectacle wearer as possible, to increase the awareness of obstacles for general mobility improvement, and also because of the potential application for persons afflicted Hemianopia who wish to drive. In driving, the vertical extent of the visual field used when viewing the roadway is quite limited (e.g., ±15 degrees or less). An image-shifting device set with the optical axis forming a 45 degree angle to the horizontal meridian could be beneficial for driving. Therefore, for an angle of 45 degrees formed between the longitudinal axis of the prism and the horizontal meridian, the decrease in horizontal expansion is about 6 degrees compared to the configuration in which the optical axis of the prism is parallel to the horizontal meridian. The vertical movement of nearly 14 degrees of the expansion area brings it well within the central area and into the vertical field that is used for driving; for the prisms of the lower image-shifting device, this configuration would raise the top of the expansion area to about 9 degrees below the fixation point.

It should be appreciated that other variations to and modifications of the above-described peripheral field expansion apparatus may be made without departing from the inventive concepts described herein. For example, an appropriate number of image-shifting elements can be used to make up the image-shifting device, and the amount of shifting that is needed will depend on the physical characteristics of the person whose peripheral vision is being enhanced. In addition, one or two image-shifting devices may be disposed on one or both carrier lenses of a spectacle frame. Alternatively, a monocular frame could be used and is considered within the general definition of a spectacle frame. The possible combinations of one or two image-shifting devices disposed on one or two carrier lenses are covered and the actual configuration of image-shifting devices and carrier lens or lenses used will depend upon the visual field loss of the person being fit with this spectacle system. Although the prism elements are depicted as being formed on the surface of the carrier lens or lenses, the prism elements can be formed within the carrier lens or lenses. Similarly, although the mirror elements are depicted as being formed within the carrier lens or lenses, the mirror elements can be formed on the outer surface of the carrier lens or lenses as well. Accordingly, the invention should not be viewed as limited except by the scope and spirit of the appended claims.

REFERENCES

Fanning G J, 1972, "Homonymous hemianopia and seeing aids," *Australian J. Optom.* 55.
Gottlieb D D, Allen C H, Eikenberry J, Ingall-Woodruff S, Johnson M, 1996. *Living with Vision Loss* (Atlanta, Ga.: St. Barthelemy Press, Ltd.).
Gottlieb D D, Fuhr A, Hatch W V, and Wright K D, "Neuro-optometric facilitation of vision recovery after acquired brain injury," *NeuoRehabilitation*, vol. 11, pp. 175-199, 1998.
Peli E, Peli D, 2002. *Driving with confidence: a practical guide to driving with low vision* (Singapore, New Jersey, London, Hong Kong: World Scientific Publishing Company).
Peli E, 2000, "Field expansion for homonymous hemianopia by otpically-induced peripheral exotropia," *Optometry and Visual Science* 77 453-464.
Rossi P W, Kheyfets S, Reding M J, 1990, "Fresnel prisms improve visual perception in stroke patients with homonymous hemianopia or unilateral visual neglect," *Neurology* 40 1597-1599.
Tant M L, Brouwer W H, Cornelissen F W, Kooijman A C, 2001, "Predictions and evaluation of driving and visuospatial performance in homonymous hemianopia after compensational training," *Visual Impairment Research* 3 133-145.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

What is claimed is:

1. A spectacle system for providing visual field shifting for a person wearing a spectacle frame having a carrier lens, the eyes of the person defining a horizontal visual meridian, the spectacle system comprising:
   a carrier lens having a central viewing area including said horizontal visual meridian and peripheral viewing areas disposed above and below said central viewing area, said peripheral viewing areas not intersecting said horizontal visual meridian nor said central viewing area; and
   an image-shifting device disposed in one or both of said peripheral viewing areas of said carrier lens, said image-shifting device including a plurality of image-shifting elements, each of said plurality of image-shifting elements being oriented such that an optical axis of each of the plurality of image-shifting elements disposed in a specific said peripheral viewing area forms an angle between 10° and 60° relative to the horizontal visual meridian.

2. The spectacle system of claim 1 wherein said image-shifting device is an upper image-shifting device disposed in the peripheral viewing area above the central viewing area, and wherein said upper image-shifting device provides a lateral and upward shift of a perceived image.

3. The spectacle system of claim 1 wherein said image-shifting device is a lower image-shifting device disposed in the peripheral viewing area below the central viewing area, and wherein the lower image-shifting device provides a lateral and downward shift of a perceived image.

4. The spectacle system of claim 1 wherein said image-shifting device includes upper and lower image-shifting devices disposed in the peripheral viewing areas above and below the central viewing area, respectively, and wherein the upper image-shifting device provides a lateral and upward shift in perceived image and the lower image-shifting device provides a lateral and downward shift in perceived image.

5. The spectacle system of claim 1 wherein said plurality of image-shifting elements are prisms and wherein said plurality of image-shifting prisms are arranged in a side by side juxtaposed arrangement on said carrier lens, forming a Fresnel-like image-shifting device.

6. The spectacle system of claim 1 wherein said plurality of image-shifting elements are image-shifting mirrors pairs and wherein said plurality of image-shifting mirrors pairs are arranged in a side by side juxtaposed arrangement on said carrier lens, forming a Fresnel-like image-shifting device.

7. The spectacle system of claim 6 wherein each of the image-shifting mirrors pairs includes a first reflecting surface and a second reflecting surface, each said reflecting surface facing toward the other and oriented to the other so as cause a predetermined angle of deviation of light.

8. The spectacle system of claim 1, wherein said spectacle frame is a binocular frame.

9. The spectacle system of claim 1, wherein said spectacle frame is a monocular frame.

10. A spectacle system for providing visual field shifting for a person wearing a spectacle frame having first and second carrier lenses, the eyes of the person defining a horizontal visual meridian, the spectacle system comprising:
    a first and a second carrier lens, each said lens having a central viewing area including said horizontal visual meridian and peripheral viewing areas disposed above and below said central viewing area, said peripheral viewing areas not intersecting said horizontal visual meridian nor said central viewing area; and
    a first image-shifting device disposed in one or both of said peripheral viewing areas of said first carrier lens and a second image-shifting device disposed in one or both of said peripheral viewing areas of said second carrier lens, said first and second image-shifting devices including first and second pluralities of image-shifting elements, respectively, each of said plurality of image-shifting elements being oriented such that an optical axis of each of the plurality of image-shifting elements disposed in a specific said peripheral viewing area forms an angle between 10° and 60° relative to the horizontal meridian.

11. The spectacle system of claim 10 wherein said first image-shifting device includes first upper and first lower image-shifting devices disposed in the peripheral viewing area above and below the central viewing area of the first and/or second carrier lens respectively, and wherein said first upper image-shifting device provides a lateral and upward shift of a perceived image and said first lower image-shifting device provides a lateral and downward shift of a perceived image.

12. The spectacle system of claim 11 wherein said second image-shifting device includes second upper and second lower image-shifting devices disposed in the peripheral viewing area above and below the central viewing area of the second carrier lens respectively, and wherein said second upper image-shifting device provides a lateral and upward shift in perceived image and said second lower image-shifting device provides a lateral and downward shift in perceived image.

13. The spectacle system of claim 10 wherein said first and second pluralities of image-shifting elements are prisms and wherein said first and second pluralities of prisms are arranged in a side by side juxtaposed arrangement on said first and/or second carrier lens respectively, forming a Fresnel-like image-shifting device.

14. The spectacle system of claim 10 wherein said first and second pluralities of image-shifting elements are image-shifting mirrors pairs and wherein said first and second plurality of image-shifting mirrors pairs are arranged in a side by side juxtaposed arrangement on said first and/or second carrier lens respectively.

15. The spectacle system of claim 14 wherein each of the image-shifting mirrors pairs includes a first reflecting surface and a second reflecting surface, each said reflecting surface facing toward the other and oriented to the other so as to cause a predetermined angle of deviation of light.

16. A spectacle system for providing visual field shifting for a person wearing a spectacle frame having a carrier lens, the eyes of the person defining a horizontal visual meridian, the spectacle system comprising:

said carrier lens having a central viewing area including said horizontal visual meridian and peripheral viewing areas disposed above and below said central viewing area;

an image-shifting mirror disposed in one or both of said peripheral viewing areas of said carrier lens, said image-shifting mirror including a plurality of image-shifting mirror elements, each of said plurality of image-shifting mirror elements oriented such that a longitudinal axis of each of the plurality of image-shifting elements is substantially orthogonal to the horizontal visual meridian.

* * * * *

UNITED STATES PATENT AND TRADEMARK OFFICE
CERTIFICATE OF CORRECTION

| | | |
|---|---|---|
| PATENT NO. | : 7,374,284 B2 | Page 1 of 1 |
| APPLICATION NO. | : 10/583682 | |
| DATED | : May 20, 2008 | |
| INVENTOR(S) | : Eliezer Peli | |

It is certified that error appears in the above-identified patent and that said Letters Patent is hereby corrected as shown below:

Column 11, claim 13, line 12, "of prisms" should read --of image-shifting prisms--.

Signed and Sealed this

Thirtieth Day of June, 2009

JOHN DOLL
*Acting Director of the United States Patent and Trademark Office*